(12) United States Patent
Xu

(10) Patent No.: US 12,449,945 B1
(45) Date of Patent: Oct. 21, 2025

(54) POLICY RISK POSITIONING METHOD AND APPARATUS, ELECTRONIC DEVICE, AND STORAGE MEDIUM

(71) Applicant: FUTU NETWORK TECHNOLOGY (SHENZHEN) CO., LTD., Guangdong (CN)

(72) Inventor: Zihong Xu, Guangdong (CN)

(73) Assignee: FUTU NETWORK TECHNOLOGY (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 18/721,208

(22) PCT Filed: Dec. 5, 2022

(86) PCT No.: PCT/CN2022/136438
§ 371 (c)(1),
(2) Date: Jun. 18, 2024

(87) PCT Pub. No.: WO2023/116399
PCT Pub. Date: Jun. 29, 2023

(30) Foreign Application Priority Data

Dec. 21, 2021 (CN) .......................... 202111575104.1

(51) Int. Cl.
*G06F 3/0481* (2022.01)
*G06F 3/0486* (2013.01)
*G06F 9/451* (2018.01)

(52) U.S. Cl.
CPC .......... *G06F 3/0481* (2013.01); *G06F 3/0486* (2013.01); *G06F 9/451* (2018.02)

(58) Field of Classification Search
CPC ........................... G06F 3/0481; G06F 3/0486
See application file for complete search history.

(56) References Cited

U.S. PATENT DOCUMENTS 7,617,156 B1 * 11/2009 Wolfson ................. G06Q 20/10
705/42
8,682,773 B1   3/2014 Murphy et al.
(Continued)

FOREIGN PATENT DOCUMENTS

CN   110503556 A   11/2019
CN   110688107 A    1/2020
(Continued)

OTHER PUBLICATIONS

International Search Report dated Feb. 16, 2023 in International Application No. PCT/CN2022/136438. English translation attached.
(Continued)

*Primary Examiner* — Scott C Anderson

(57) ABSTRACT

Provided are a policy risk positioning method and apparatus, an electronic device, and a storage medium. The method includes: constructing a to-be-applied policy in response to a drag-and-drop operation on a control in a canvas region; detecting a global composition of all controls in the canvas region in response to meeting a first policy detection condition, to obtain a global detection result; detecting an internal parameter of each control in the canvas region in response to meeting a second policy detection condition, to obtain an intra-control detection result; detecting a connection relationship between adjacent controls in the canvas region in response to meeting a third policy detection condition, to obtain an inter-control detection result; and positioning a risk existing in the to-be-applied policy based on the global detection result, the intra-control detection result and the inter-control detection result.

13 Claims, 4 Drawing Sheets

(56) References Cited

U.S. PATENT DOCUMENTS

| | | | |
|---|---|---|---|
| 10,789,646 | B2 | 9/2020 | Lane et al. |
| 11,024,105 | B1* | 6/2021 | Brand ................ G06K 7/10366 |
| 11,526,524 | B1* | 12/2022 | Saulys ...................... G06F 8/34 |
| 11,689,475 | B2* | 6/2023 | Goyal ..................... H04L 47/82 |
| | | | 709/226 |
| 2006/0107306 | A1 | 5/2006 | Thirumalai et al. |
| 2008/0052137 | A1 | 2/2008 | Ziade et al. |
| 2011/0173084 | A1 | 7/2011 | Cheng et al. |
| 2013/0347116 | A1* | 12/2013 | Flores ................ H04L 63/1433 |
| | | | 726/25 |
| 2015/0235318 | A1 | 8/2015 | Huan |
| 2016/0125535 | A1 | 5/2016 | Singer |
| 2019/0104156 | A1* | 4/2019 | Barkovic ............ G06F 3/04847 |
| 2019/0303270 | A1* | 10/2019 | Hoermann .......... G06F 11/3636 |

FOREIGN PATENT DOCUMENTS

| | | | |
|---|---|---|---|
| CN | 111176635 | A | 5/2020 |
| CN | 111583017 | A | 8/2020 |
| CN | 113254003 | A | 8/2021 |
| CN | 114237477 | A | 3/2022 |
| CN | 115053245 | A | 9/2022 |
| JP | 2017092632 | A | 5/2017 |
| JP | 2020195141 | A | 12/2020 |

OTHER PUBLICATIONS

First Office Action from corresponding Chinese Application No. 202111575104.1, dated Dec. 1, 2023. English translation attached.
The Grant Notice from corresponding Chinese Application No. 202111575104.1, dated Apr. 18, 2024. English translation attached.
Yu Gaohan "Financial data analysis and risk quantification based on Python." 2021 International Conference on Computer, Blockchain and Financial Development (CBFD), Apr. 25, 2021(Apr. 25, 2021), p. 214-217.
Wu Yichun "The Research of Risk Control in Internet Finance Innovation." A Complete Collection of China's Outstanding Master's Degree Theses Economics and Management Science Series, Jan. 15, 2019(Jan. 15, 2019).
First Office Action dated Dec. 13, 2024 received in corresponding patent family application No. JP2024-537596. English translation attached.
Basics of LabVIEW Programming Environment Tutorial. Oct. 22, 2021 Time [32:00-35:09]. A copy may be obtained from the URL at https://www.youtube.com/watch?v=1WIE_onbeY.
First Office Action dated Aug. 29, 2025 received in corresponding patent family application No. SG11202404260P.

* cited by examiner

POLICY RISK POSITIONING METHOD AND APPARATUS, ELECTRONIC DEVICE, AND STORAGE MEDIUM

CROSS-REFERENCE TO RELATED APPLICATION

This application is a national phase application of PCT international patent application PCT/CN2022/136438, filed on Dec. 5, 2022 which claims priority to Chinese patent application No. 202111575104.1, titled "POLICY RISK POSITIONING METHOD AND APPARATUS, ELECTRONIC DEVICE, AND STORAGE MEDIUM" and filed on Dec. 21, 2021, the entire contents of which are incorporated herein by reference.

FIELD

The present disclosure relates to quantitative components in the financial field, and more particularly, to a policy risk positioning method and apparatus, an electronic device, and a storage medium.

BACKGROUND

In the financial field, quantitative learning and quantitative operations are difficult, which leads to risks in policies constructed by non-professional users during a quantitative process. Consequently, their policies often fail to apply normally, resulting in failures of the quantitative operations. Therefore, a solution needs to be provided urgently to overcome the above-mentioned defects.

SUMMARY

An objective of the present disclosure is to provide a policy risk positioning method and apparatus, an electronic device, and a storage medium, capable of improving safety of a constructed policy.

According to an embodiment in one aspect of the present disclosure, a policy risk positioning method is provided. The method includes: constructing a to-be-applied policy in response to a drag-and-drop operation on a control in a canvas region; detecting a global composition of all controls in the canvas region in response to meeting a first policy detection condition, to obtain a global detection result; detecting an internal parameter of each control in the canvas region in response to meeting a second policy detection condition, to obtain an intra-control detection result; detecting a connection relationship between adjacent controls in the canvas region in response to meeting a third policy detection condition, to obtain an inter-control detection result; and positioning a risk existing in the to-be-applied policy based on the global detection result, the intra-control detection result and the inter-control detection result.

According to an embodiment in another aspect of the present disclosure, a policy risk positioning apparatus is provided. The apparatus includes: a policy construction module configured to construct a to-be-applied policy in response to a drag-and-drop operation on a control in a canvas region; a global detection module configured to detect a global composition of all controls in the canvas region in response to meeting a first policy detection condition, to obtain a global detection result; an intra-control detection module configured to detect an internal parameter of each control in the canvas region in response to meeting a second policy detection condition, to obtain an intra-control detection result; an inter-control detection module configured to detect a connection relationship between adjacent controls in the canvas region in response to meeting a third policy detection condition, to obtain an inter-control detection result; and a risk positioning module configured to position a risk existing in the to-be-applied policy based on the global detection result, the intra-control detection result and the inter-control detection result.

In an exemplary embodiment of the present disclosure, the apparatus is configured to: traverse an internal function of each condition control in response to meeting the first policy detection condition; and obtain, based on a function name of the internal function and a parameter name of the internal function, a quantity of market underlying objects used by all condition controls in the canvas region, to obtain a global detection result indicating the quantity of the market underlying objects; and determine that the to-be-applied policy has a risk in terms of the quantity of the market underlying objects when the quantity of the market underlying objects indicated by the global detection result is greater than a predetermined underlying object quantity threshold.

In an exemplary embodiment of the present disclosure, the apparatus is configured to: detect, in response to meeting the first policy detection condition, an island control isolated from a start box of the to-be-applied policy, to obtain a global detection result indicating the island control; and position, based on the island control indicated by the global detection result, the island control, and determine that the to-be-applied policy has a risk in terms of the island control.

In an exemplary embodiment of the present disclosure, the apparatus is configured to: traverse controls downwards level by level along a path where the start box is located to obtain a set of traversed controls; and eliminate the set of traversed controls from all the controls in the canvas region, and determine each of the remaining controls of all the controls in the canvas region as the island control.

In an exemplary embodiment of the present disclosure, the apparatus is configured to: traverse controls upwards level by level along a path where a leaf node control is located, until a vertex node control located at a vertex of the path where the leaf node control is located is traversed; and determine, in response to determining that a node type of the vertex node control is not a start box, each control traversed along the path where the leaf node control is located as the island control.

In an exemplary embodiment of the present disclosure, the apparatus is configured to: detect, in response to meeting the first policy detection condition, a node type of each leaf node control, to obtain a global detection result indicating a leaf node control with a node type being a non-event box; and position, based on the leaf node control with the node type being the non-event box as indicated by the global detection result, the leaf node control with the node type being the non-event box, and determine that the to-be-applied policy has a risk in terms of the leaf node control with the node type being the non-event box.

In an exemplary embodiment of the present disclosure, the apparatus is configured to: traverse the internal parameter of each control in response to meeting the second policy detection condition; and determine, based on a global variable used by the internal parameter, a global variable missed by the control, to obtain an intra-control detection result indicating the global variable missed by the control; and determine, based on the global variable missed by the control as indicated by the intra-control detection result, that the to-be-applied policy has a risk in terms of the global variable missed by the control.

In an exemplary embodiment of the present disclosure, the apparatus is configured to: determine, in response to meeting the second policy detection condition, logical legitimacy of a combinatorial condition in the to-be-applied policy based on the detected internal parameter of each control, to obtain an intra-control detection result indicating the logical legitimacy of the combinatorial condition; and position a logically illegal combinatorial condition in the to-be-applied policy based on the logical legitimacy of the combinatorial condition, and determine that the to-be-applied policy has a risk in terms of the logically illegal combinatorial condition.

In an exemplary embodiment of the present disclosure, the apparatus is configured to: detect, in response to meeting the third policy detection condition, a control with a node type being a condition box, and determine a definition of an exit connection line of the condition box, to obtain an inter-control detection result indicating the definition of the exit connection line; and position an incorrect connection line of the condition box based on the definition of the exit connection line indicated by the inter-control detection result, and determine that the to-be-applied policy has a risk in terms of the incorrect connection line.

According to an embodiment in yet another aspect of the present disclosure, an electronic device is provided. The electronic device includes: one or more processors; and a storage device configured to store one or more programs. The one or more programs, when executed by the one or more processors, cause the electronic device to perform any of the above embodiments.

According to an embodiment in still yet another aspect of the present disclosure, a computer program medium is provided. The computer program medium stores computer-readable instructions. The computer-readable instructions, when executed by a processor of a computer, cause the computer to perform any of the above embodiments.

According to an embodiment in still yet another aspect of the present disclosure, a computer program product or a computer program is provided. The computer program product or the computer program includes computer instructions stored in a computer-readable storage medium. A processor of a computer device is configured to read the computer instructions from the computer-readable storage medium. The processor is configured to execute the computer instructions to cause the computer device to perform the method according to any of the alternative embodiments described above.

With the policy risk positioning method provided by the present disclosure, a visual control operation approach can be provided for a user to enable the user to construct the to-be-applied policy through dragging and dropping controls. In addition, in the present disclosure, a risk in the constructed to-be-applied policy is positioned based on a global detection, an intra-control detection, and an inter-control detection, which improves accuracy of risk positioning, improving safety of the constructed to-be-applied policy.

Other features and advantages of the present disclosure will become apparent from the following detailed description, or can be learned at least in part from practicing of the present disclosure.

It should be understood that the above general description and the following detailed description are merely exemplary and do not limit the present disclosure.

BRIEF DESCRIPTION OF THE DRAWINGS

The above and other objectives, features, and advantages of the present disclosure will become more apparent by describing in detail exemplary embodiments of the present disclosure with reference to the accompanying drawings.

DETAILED DESCRIPTION

Figure 1:
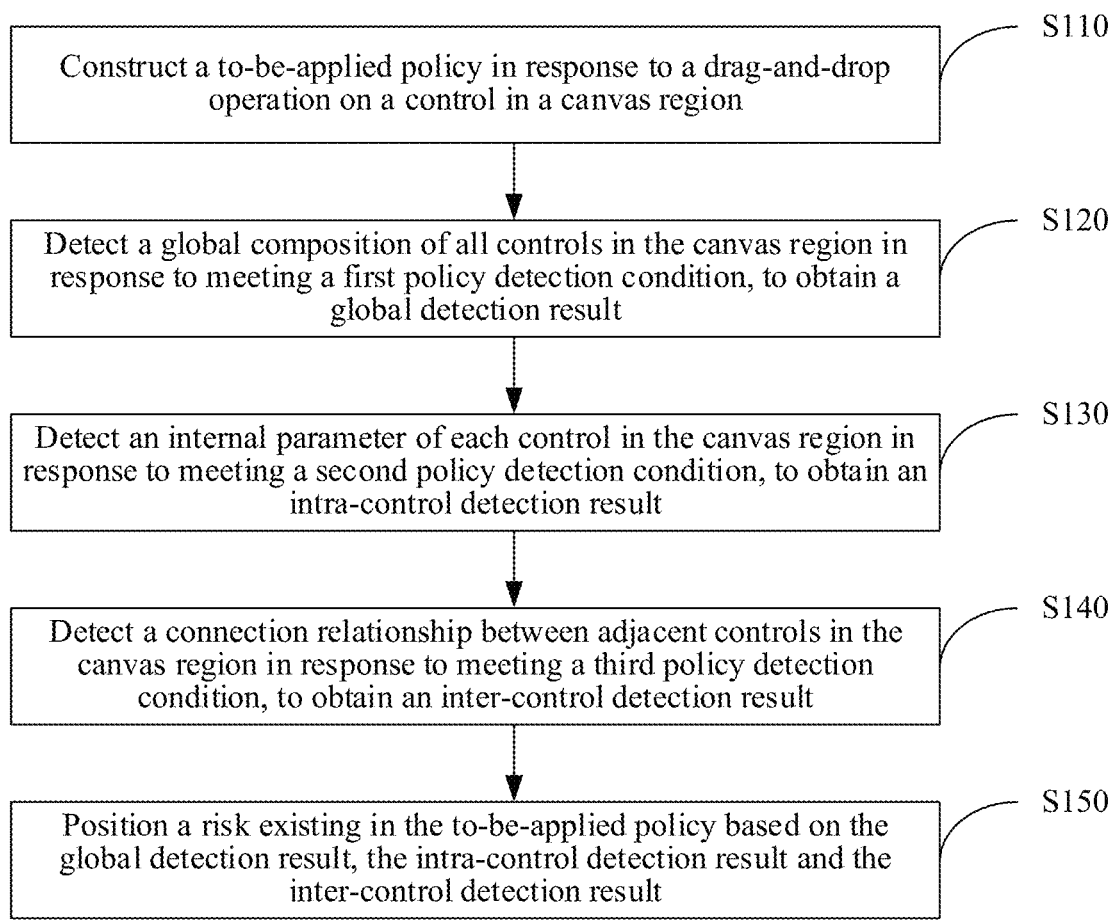
FIG. 1 illustrates a flowchart of a policy risk positioning method according to an embodiment of the present disclosure.

Exemplary embodiments will now be described in detail below with reference to the accompanying drawings. However, the exemplary embodiments can be implemented in various forms, and should not be construed as being limited to examples set forth herein. On the contrary, the exemplary embodiments are provided to facilitate thorough and comprehensive description of the present disclosure, and fully convey the concept of the exemplary embodiments to those skilled in the art. The accompanying drawings are only schematic illustrations of the present disclosure and are not necessarily drawn to scale. Same reference numerals in the figures denote same or similar parts, and thus repeated description of the same reference numerals will be omitted here.

In addition, described features, structures, or characteristics may be combined in one or more exemplary embodiments in any suitable manner. In the following description, many specific details are provided to facilitate understanding of the exemplary embodiments of the present disclosure. However, it is conceivable for those skilled in the art that technical solutions of the present disclosure can be practiced without one or more specific details, or other methods, components, steps, etc., may be adopted. In other cases, well-known structures, methods, implementations, or operations are not illustrated or described in detail, to avoid obscuring various aspects of the present disclosure.

Some of the block diagrams illustrated in the figures are functional entities and do not necessarily correspond to physically or logically independent entities. These functional entities may be implemented in a form of software, or in one or more hardware modules or integrated circuits, or in different networks and/or processor apparatuses and/or microcontroller apparatuses.

A policy risk positioning method is provided by the present disclosure. The method is mainly applied in quantitative components in the financial field. In an exemplary embodiment of the present disclosure, a quantization component is for a user to perform a drag-and-drop operation on a control in a canvas region of the quantization component, and to construct a corresponding policy in conjunction with a connection line between controls. Typically, node types of the controls include a start box, a condition box, and an event box. The constructed policy may be configured for live trading or historical backtesting. The live trading refers to applying policies in real trading scenarios to carry out real-time transactions. The historical backtesting refers to using historical data to detect effectiveness of policies.

FIG. 1 illustrates a flowchart of a policy risk positioning method according to an embodiment of the present disclosure. An exemplary execution body of the method is the quantitative component. The method includes operations at blocks.

At block S110, a to-be-applied policy is constructed in response to a drag-and-drop operation on a control in a canvas region.

At block S120, a global composition of all controls in the canvas region is detected in response to meeting a first policy detection condition, to obtain a global detection result.

At block S130, an internal parameter of each control in the canvas region is detected in response to meeting a second policy detection condition, to obtain an intra-control detection result.

At block S140, a connection relationship between adjacent controls in the canvas region is detected in response to meeting a third policy detection condition, to obtain an inter-control detection result.

At block S150, a risk existing in the to-be-applied policy is positioned based on the global detection result, the intra-control detection result, and the inter-control detection result.

In the embodiments of the present disclosure, the quantitative component provides its canvas region to the user, and thus the user can construct a policy in the canvas region of the quantization component. In response to the drag-and-drop operation on the control in the canvas region, a corresponding to-be-applied policy is constructed by the quantization component. In this embodiment, the to-be-applied policy is used for automatically trading an underlying object.

During policy construction, the global composition of all the controls in the canvas region is detected by the quantitative component in response to meeting the first policy detection condition, to obtain the global detection result. That is, all the controls in the canvas region are determined as one detection object. The global composition of the one detection object is detected to obtain the global detection result.

During the policy construction, the internal parameter of each control in the canvas region is detected by the quantitative component in response to meeting the second policy detection condition, to obtain the intra-control detection result. That is, each control in the canvas region is determined as one detection object. The internal parameter of each detection object is detected to obtain the intra-control detection result.

During the policy construction, the connection relationship between adjacent controls in the canvas region is detected by the quantitative component in response to meeting the third policy detection condition, to obtain the inter-control detection result. That is, each group of two adjacent controls in the canvas region are determined as one pair of detection objects. The connection relationship between each pair of detection objects is detected to obtain the inter-control detection result.

Then, the risk existing in the to-be-applied policy is positioned based on the global detection result, the intra-control detection result, and the inter-control detection result.

Therefore, with the policy risk positioning method provided by the present disclosure, a visual control operation approach can be provided for a user to enable the user to construct the to-be-applied policy through dragging and dropping controls. In addition, in the present disclosure, a risk in the constructed to-be-applied policy is positioned based on a global detection, an intra-control detection, and an inter-control detection, which improves accuracy of risk positioning, improving safety of the constructed to-be-applied policy.

In an embodiment, a quantity of all the controls in the canvas region is detected in response to meeting the first policy detection condition, to obtain a global detection result indicating the quantity of all the controls. The to-be-applied policy is determined to have a risk in terms of the quantity of all the controls when the quantity of all the controls indicated by the global detection result is greater than a predetermined control quantity threshold.

In this embodiment, the global detection is performed from a perspective of a quantity of controls. In an exemplary embodiment of the present disclosure, the quantity of all the controls used to construct the to-be-applied policy in the canvas region is detected subsequent to meeting the first policy detection condition. When the quantity of all the controls is greater than the predetermined control quantity threshold, it is indicated that too many controls are used to construct the to-be-applied policy, which overloads a capacity of the quantitative component, thereby resulting in a risk. Further, subsequent to a determination that the to-be-applied policy has a risk in terms of the quantity of all the controls, an error alert may be triggered to alert the user that the to-be-applied policy he/she constructs in the canvas region may be unable to function properly due to the quantity of all the controls exceeding a limit.

In an embodiment, an internal function of each condition control is traversed in response to meeting the first policy detection condition; and a quantity of market underlying objects used by all condition controls in the canvas region is obtained based on a function name of the internal function and a parameter name of the internal function, to obtain a global detection result indicating the quantity of the market underlying objects. The to-be-applied policy is determined to have a risk in terms of the quantity of the market underlying objects when the quantity of the market underlying objects indicated by the global detection result is greater than a predetermined underlying object quantity threshold.

In this embodiment, the global detection is performed from a perspective of the quantity of the market underlying objects. In an exemplary embodiment of the present disclosure, since the essence of the condition control is to invoke market data in the quantitative component, and the quantitative component needs to limit an access frequency of the market data to protect a background, the quantity of market underlying objects used needs to be limited. Subsequent to meeting the first policy detection condition, all the condition controls in the canvas region are detected, and then the quantity of the market underlying objects used by all the condition controls is determined. When the quantity of the market underlying objects is greater than the predetermined underlying object quantity threshold, it is indicated that too many market underlying objects are used to construct the to-be-applied policy, which threatens the background, thereby resulting in a risk. Further, subsequent to a determination that the to-be-applied policy has a risk in terms of the quantity of the market underlying objects, an error alert may be triggered to alert the user that the to-be-applied policy he/she constructs in the canvas region may be unable to function properly due to the quantity of the market underlying objects exceeding a limit.

In an embodiment, an island control isolated from a start box of the to-be-applied policy is detected in response to meeting the first policy detection condition, to obtain a global detection result indicating the island control. The island control is positioned based on the island control indicated by the global detection result, and the to-be-applied policy is determined to have a risk in terms of the island control.

Figure 2:
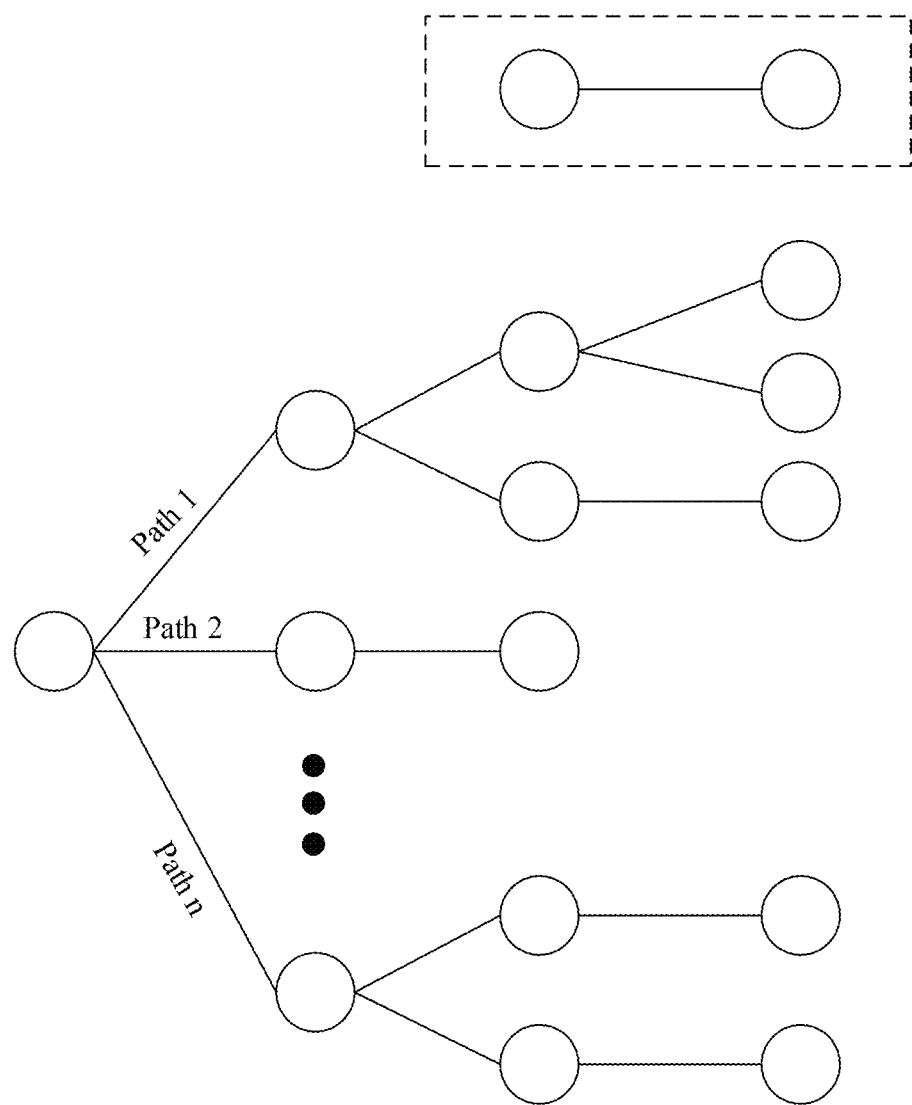
FIG. 2 illustrates a schematic diagram of an island control according to an embodiment of the present disclosure.

In this embodiment, the global detection is performed from a perspective of global topology. In an exemplary embodiment of the present disclosure, the island control in the canvas region is detected subsequent to meeting the first policy detection condition. Reference may be made to island controls circled by the dotted box in FIG. 2. The island control refers to a control that is isolated from the start box and has no direct connection relationship or indirect connection relationship with the start box. When island controls exist, it is indicated that the island controls do not function as part of the constructed to-be-applied policy and thereby resulting in a risk. Further, subsequent to a determination that the to-be-applied policy has a risk in terms of the island control, an error alert may be triggered to alert the user that the to-be-applied policy he/she constructs in the canvas region may be unable to function properly due to the island control.

In an embodiment, controls are traversed downwards level by level along a path where the start box is located to obtain a set of traversed controls. The set of traversed controls is eliminated from all the controls in the canvas region, and each of the remaining controls of all the controls in the canvas region is determined as the island control.

In the embodiment, the start box serving as a root node control in the canvas region is positioned. Then, the controls are traversed downwards level by level along the path where the start box is located. All the traversed controls have a direct connection relationship or indirect connection relationship with the start box, and thus should not be determined as the island control. When all paths to the start box are traversed, the set of traversed controls contains all controls which should not be determined as the island control. In addition, controls that are not in the set of traversed controls should be determined as the island control. Therefore, the set of traversed controls is eliminated from all the controls in the canvas region, and then each of the remaining controls of all the controls in the canvas region is determined as the island control.

In an embodiment, controls are traversed upwards level by level along a path where a leaf node control is located, until a vertex node control located at a vertex of the path where the leaf node control is located is traversed. Each control traversed along the path where the leaf node control is located is determined as the island control, in response to determining that a node type of the vertex node control is not a start box.

In the embodiment, each leaf node control at a lowest level in the canvas region is positioned, and then the controls are traversed upwards level by level along a path where the leaf node control is located, until a corresponding vertex node control is traversed. The vertex node control refers to a control that does not have a parent node and is located at a vertex of the path. When the island control exists, multiple vertex node controls exist in the canvas region, but only one of the multiple vertex node controls is determined as the start box for the root node control.

In a case where a vertex node control of one leaf node control is not the start box, all controls from the leaf node control to a vertex node control corresponding to the leaf node are isolated from the start box. Therefore, all controls traversed along a path where the leaf node control is located are determined as island controls.

In an embodiment, a node type of each leaf node control is detected in response to meeting the first policy detection condition, to obtain a global detection result indicating a leaf node control with a node type being a non-event box. The leaf node control with the node type being the non-event box is positioned based on the leaf node control with the node type being the non-event box as indicated by the global detection result. The to-be-applied policy is determined to have a risk in terms of the leaf node control with the node type being the non-event box.

In this embodiment, the global detection is performed from a perspective of the node type of the leaf node control. In an exemplary embodiment of the present disclosure, for the to-be-applied policy to function properly, an end of the path must be an event box. That is, the leaf node control must be an event box. Subsequent to meeting the first policy detection condition, the node type of each leaf node control in the canvas region belongs is detected, to determine a leaf node control with the node type being the event box and a leaf node control with the node type being the non-event box. The leaf node control with the node type being the non-event box affects normal application of the to-be-applied policy, thereby resulting in a risk. Further, subsequent to a determination that the to-be-applied policy has a risk in terms of the leaf node control with the node type being the non-event box, an error alert may be triggered to alert the user that the to-be-applied policy he/she constructs in the canvas region may be unable to function properly due to the fact that the node type of the leaf node control is not the event box.

In an embodiment, the first policy detection condition includes a detection of a backtest operation performed on the to-be-applied policy, a detection of a live trading operation performed on the to-be-applied policy, and a detection of a logic verification operation performed on the to-be-applied policy.

In this embodiment, any first policy detection condition is capable of triggering the global detection. The global detection may be triggered by the user's backtest operation on the to-be-applied policy, or the user's live trading operation on the to-be-applied policy, or the user's logic verification operation on the to-be-applied policy.

In an embodiment, an intra-control detection is performed from a perspective of policy type and function type. The policy type refers to an account type corresponding to a user account. The account type includes a futures account and a securities account. A function used by each control corresponds to a function type. Some function types are only applicable to futures accounts, some are only applicable to securities accounts, and some are applicable to both futures accounts and securities accounts. To ensure that the account type matches the function type, the policy type and the function type need to be detected.

In an exemplary embodiment of the present disclosure, subsequent to meeting the second policy detection condition, the policy type is obtained based on the start box to determine the account type. Each function used in the control is traversed to view the function type of the function. Then, the function type is compared with the account type to determine whether the function type matches the account type. When the function type fails to match the account type, the normal application of the policy is affected, thereby resulting in a risk. Further, subsequent to a determination that the to-be-applied policy has a risk in terms of a mismatch between the policy type and the function type, an error alert may be triggered to alert the user that the to-be-applied policy he/she constructs in the canvas region may be unable to function properly due to a mismatch between the policy type and the account type or a mismatch between the function type and the account type.

In an embodiment, the internal parameter of each control is traversed in response to meeting the second policy detection condition. A global variable missed by the control is determined based on a global variable used by the internal parameter, to obtain an intra-control detection result indicating the global variable missed by the control. The to-be-applied policy is determined, based on the global variable missed by the control as indicated by the intra-control detection result, to have a risk in terms of the global variable missed by the control.

In this embodiment, the intra-control detection is performed from a perspective of the global variable. In an exemplary embodiment of the present disclosure, the internal parameter of each control is traversed subsequent to meeting the second policy detection condition. When the control with the node type being the start box is traversed, a set of global variables is established based on the global variables defined in the start box. Global variables used by other controls are eliminated from the set of global variables when other controls are traversed. After all controls are traversed, the remaining global variables in the set of global variables are global variables that have not been used, i.e., global variables missed by the control. A risk is likely to occur when the global variables missed by the control exist. Further, subsequent to a determination that the to-be-applied policy has a risk in terms of the global variable missed by the control, an error alert may be triggered to alert the user that the to-be-applied policy he/she constructs in the canvas region may be unable to function properly due to the global variables missed by the control.

In an embodiment, the intra-control detection is performed from a perspective of a required parameter. The parameter that must be filled in is the required parameter. An omission of the required parameter affects the normal application of the to-be-applied policy. In an exemplary embodiment of the present disclosure, a mapping table of required parameters is pre-configured. Subsequent to meeting the second policy detection condition, the internal parameter of each control is traversed to detect whether the internal parameter is manually entered and has an empty value. When the internal parameter is manually entered, has an empty value, and is located in the mapping table, it is determined that the internal parameter is the omitted required parameter, which results in a risk. Further, subsequent to a determination that the to-be-applied policy has a risk in terms of the omitted required parameter, an error alert may be triggered to alert the user that the to-be-applied policy he/she constructs in the canvas region may be unable to function properly due to the omitted required parameter.

In an embodiment, in response to meeting the second policy detection condition, logical legitimacy of a combinatorial condition in the to-be-applied policy is determined based on the detected internal parameter of each control, to obtain an intra-control detection result indicating the logical legitimacy of the combinatorial condition. A logically illegal combinatorial condition in the to-be-applied policy is positioned based on the logical legitimacy of the combinatorial condition. The to-be-applied policy is determined to have a risk in terms of the logically illegal combinatorial condition.

In this embodiment, the intra-control detection is performed from a perspective of the logical legitimacy of the combinatorial condition. In an exemplary embodiment of the present disclosure, the internal parameter of each control is detected subsequent to meeting the second policy detection condition. Then, a sub-condition used by the control is extracted from the internal parameter. Whether the combinatorial condition formed by a combination of multiple sub-conditions is logically legal is detected based on a logical relationship between the sub-conditions. When logic of the combinatorial condition is incomplete, the to-be-applied policy may be unable to function properly. Further, subsequent to a determination that the to-be-applied policy has a risk in terms of the logically illegal combinatorial condition, an error alert may be triggered to alert the user that the to-be-applied policy he/she constructs in the canvas region may be unable to function properly due to logical illegitimacy of the combinatorial condition.

Each sub-condition, logical symbol, and parenthesis is included in a data structure called Quant Condition Group AST Node (QCGAN) in the combinatorial condition. In the QCAGN, an enumerated value is used to identify types of data. Types include conditions, logical symbols, opening parentheses, and closing parentheses. Since an input order of QCAGNs is fixed, an array is used for storage. In addition, a table is used to maintain subscript positions of QCAGNs and error information corresponding to the subscript positions. Every time an illegal QCAGN is determined, a subscript of the illegal QCAGN in the array and error information corresponding to the illegal QCAGN are recorded in the table. In addition, a stack is used to determine a closure of an opening parenthesis and a closing parenthesis: every time the opening parenthesis is encountered, the array subscript of the illegal QCAGN is pushed into the stack; and every time a right parenthesis is encountered, the array subscript is popped from the stack. For the processing of the QCAGN, a determination is performed on a type of the QCAGN processed this time and a type of a previous QCAGN each time to determine whether the combinatorial condition is logically legal. The determination is as follows.

1. For a QCAGN whose type is a condition, when the QCAGN does not appear at a start position, and a type of a previous QCAGN is not an opening parenthesis or a logical symbol, the QCAGN is logically illegal, otherwise the QCAGN is logically legal.

2. For a QCAGN whose type is a logical symbol, when a type of a previous QCAGN is not a closing parenthesis or a condition, the QCAGN is logically illegal, otherwise the QCAGN is logically legal.

3. For a QCAGN whose type is an opening parenthesis, when the QCAGN does not appear at the start position, and a type of a previous QCAGN is not a logical symbol or an opening parenthesis, the QCAGN is logically illegal, otherwise the QCAGN is logically legal.

4. For a QCAGN whose type is a closing parenthesis, whether a stack is empty is determined. When the stack is empty, it means that there is no corresponding opening parenthesis. Then, a type of a previous QCAGN is determined. When the type of the previous QCAGN is not a closing parenthesis or a condition, the QCAGN is logically illegal, otherwise the QCAGN is logically legal.

In an embodiment, the intra-control detection is performed from a perspective of the sub-condition of the combinatorial condition. Sub-conditions are an important part of the combinatorial condition. If the user creates a sub-condition but do not use the sub-condition, a risk of operational errors exists. In an exemplary embodiment of the present disclosure, a table for recording usage records of sub-conditions is maintained in a data structure of the combinatorial condition. Sub-conditions used are counted by this table. Subsequent to meeting the second policy detection condition, the table is looked up to position the sub-condition with a count of 0, and the to-be-applied policy is determined to be have a risk in terms of the sub-condition with a count of 0. Further, subsequent to a determination that the to-be-applied policy has a risk in terms of the sub-condition with a count of 0, an error alert may be triggered to alert the user that the to-be-applied policy he/she constructs in the canvas region may be unable to function properly due to a presence of unused sub-conditions in the combinatorial condition.

In an embodiment, the intra-control detection is performed from a perspective of an underlying object applicable to a signal condition. The essence of the signal condition is to invoke market data through the quantitative component, but these market data are for a specific underlying object. For example, there is no Greeks data for a stock underlying object. The Greeks data is only for an option underlying object. Underlying objects that do not apply to the signal condition affect the normal application of the to-be-applied policy. In an exemplary embodiment of the present disclosure, the signal condition corresponding to a function is encapsulated to obtain a function table used to maintain function information. The function information maintained in the function table includes an account type applicable to the function and an underlying object type applicable to the function. Subsequent to meeting the second policy detection condition, underlying object information of the signal condition is queried. The queried underlying object information is compared with the function information maintained in the function table to determine whether a risk exists in the underlying object applicable to the signal condition. Further, subsequent to a determination that the to-be-applied policy has a risk in terms of the underlying object applicable to the signal condition, an error alert may be triggered to alert the user that the to-be-applied policy he/she constructs in the canvas region may be unable to function properly due to an error in the underlying object used by the signal condition.

In an embodiment, the intra-control detection is performed from a perspective of an underlying object applicable to an account condition. The essence of the account condition is to invoke market data relevant to the account through the quantitative component, but the account is also for a specific underlying object. For example, a stock account cannot invoke data of a futures underlying object. Underlying objects that do not apply to the account condition affect the normal operation of the to-be-applied policy. In an exemplary embodiment of the present disclosure, subsequent to meeting the second policy detection condition, the policy type is obtained based on the start box. Controls are traversed to collect underlying objects in the to-be-applied policy. The underlying objects in the to-be-applied policy are compared with the policy type to determine whether the underlying object applicable to the account condition has a risk. Further, subsequent to a determination that the to-be-applied policy has a risk in terms of the underlying object applicable to the account condition, an error alert may be triggered to alert the user that the to-be-applied policy he/she constructs in the canvas region may be unable to function properly due to an error in the underlying object used by the account condition.

In an embodiment, the second policy detection condition includes a detection of an edit operation performed on the control. The edit operation includes editing a property bar and editing a combinatorial condition window.

In an embodiment, a control with a node type being a condition box is detected in response to meeting the third policy detection condition, and a definition of an exit connection line of the condition box is determined, to obtain an inter-control detection result indicating the definition of the exit connection line. An incorrect connection line of the condition box is positioned based on the definition of the exit connection line indicated by the inter-control detection result. The to-be-applied policy is determined to have a risk in terms of the incorrect connection line.

In this embodiment, generally, a maximum of two connection lines may be pulled from an exit of the condition box. Definitions of the two connection lines ("Yes", "No") may be edited by the user. If these two connection lines have a same definition, the normal application of the policy is affected. In an exemplary embodiment of the present disclosure, subsequent to meeting of the second policy detection condition, the controls are traversed. When the condition box is traversed, it is determined whether the definitions of the connection lines at the exit are the same, to determine whether the incorrect connection line exists. Further, subsequent to a determination that the to-be-applied policy has a risk in terms of the incorrect connection line, an error may can be triggered to alert the user that the to-be-applied policy he/she constructs in the canvas region may be unable to function properly due to the incorrect connection line.

In an embodiment, the third policy detection condition includes a detection of a remove operation performed on the control and a detection of a line connection operation performed on the control.

Figure 3:
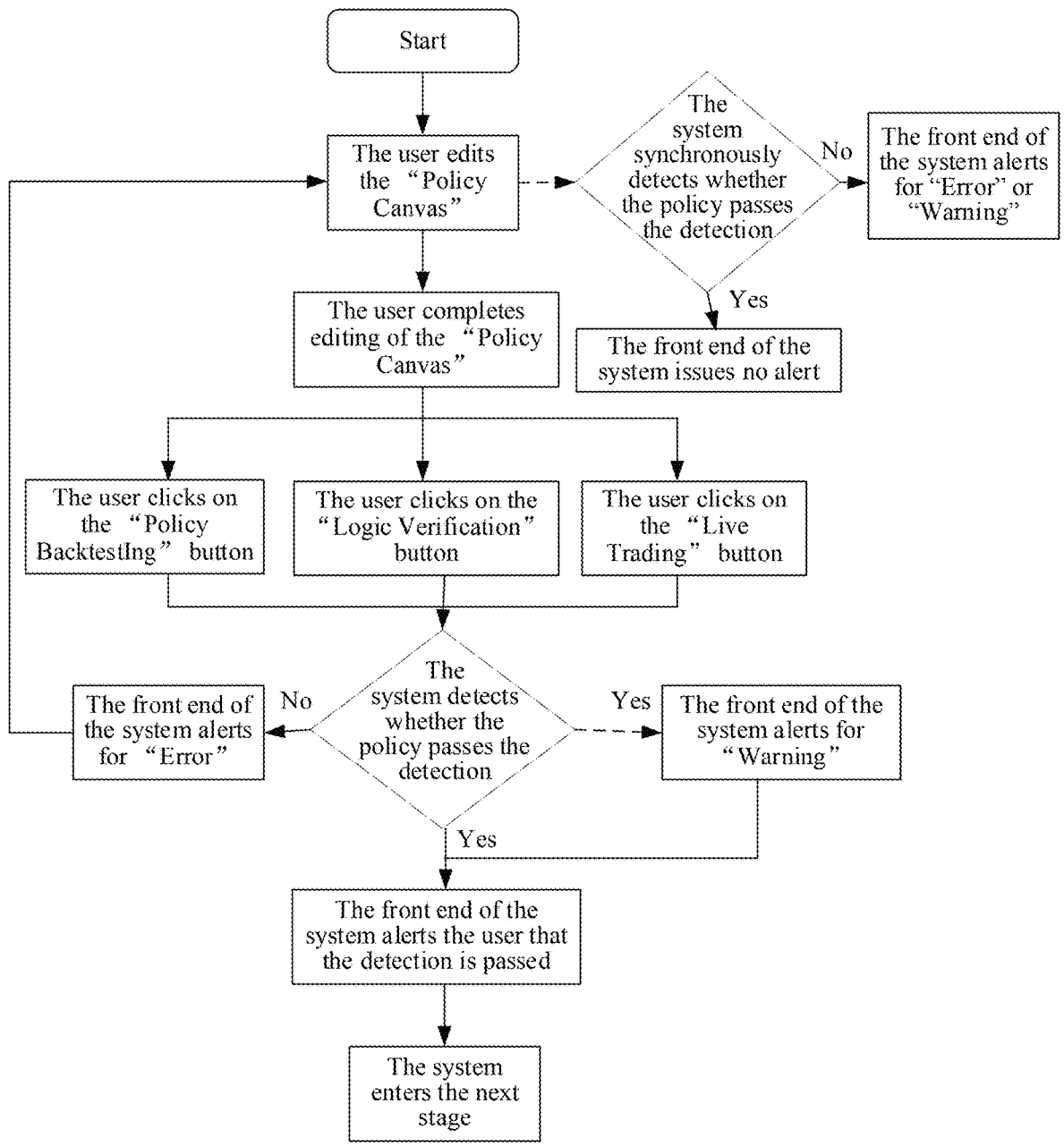
FIG. 3 illustrates a schematic diagram of an interaction between a user and a quantitative component according to an embodiment of the present disclosure.

FIG. 3 illustrates a schematic diagram of an interaction between a user and a quantitative component according to an embodiment of the present disclosure.

In this embodiment, detecting the canvas region in the quantitative component is a necessary process leading to policy backtesting and live trading. When the user directly clicks the "Policy Backtesting" button or the "Live Trading" button instead of the "Logic Verification" button, the system of the quantitative component also performs a detection on the to-be-applied policy constructed in the canvas region, and then performs the policy backtesting or the live trading after the detection is passed.

In an exemplary embodiment of the present disclosure, the user performs an edition on the canvas region to construct a to-be-applied policy. Subsequent to a completion of the edition, the detection of the to-be-applied policy is triggered in response to clicking on the "Logic Verification" button, the "Policy Backtesting" button, or the "Live Trading" button.

When the to-be-applied policy passes the detection, a front end of the system alerts a pass, and then the system enters a next stage. In addition, since the policy logic passing the detection means that there is no error that affects the normal application of the to-be-applied policy, optionally, the front end of the system also issues a warning alarm in response to detecting that the to-be-applied policy has a risk of resulting in errors.

When the to-be-applied policy fails to pass the detection, the front end of the system alerts an error (for example, a color display control may be provided, or an error mark "x" may be displayed on a connection line between two controls). The user can re-edit the canvas region to remove the error. In another exemplary embodiment of the present disclosure, the system may synchronously detect whether the to-be-applied policy passes the detection during the user's editing of the canvas region, and issue a corresponding alert based on a detection result.

Further, in this embodiment, an abnormal parameter of this quantitative trading policy may be measured based on the global detection result, the intra-control detection result, and the inter-control detection result. When the abnormal parameter is greater than or equal to a predetermined abnormality threshold, this quantitative trading policy is re-constructed, or the user is reminded whether to re-construct this quantitative trading policy as there are many abnormalities in this quantitative trading policy. When the abnormal parameter is smaller than the predetermined abnormality threshold, abnormalities and errors in this quantitative trading policy are modified and improved.

In an exemplary embodiment of the present disclosure, when the abnormal parameter is calculated, a quantity of abnormalities occurring in the global detection result, the intra-control detection result, and the inter-control detection result are obtained, which are determined as a first abnormality quantity Ece_1, a second abnormality quantity Ece_2, and a third abnormality quantity Ece_3, respectively. Also, a total number of policy application paths included in the global detection result, the intra-control detection result, and the inter-control detection result are obtained, which are determined as a first path quantity Path_1, a second path quantity Path_2, and a third path quantity Path_3, respectively. The abnormal parameter Para_ab is calculated by using the following formula:

$$\text{Para\_ab} = \alpha \cdot \frac{\text{Ece\_1}}{\text{Path\_1}} + \beta \cdot \frac{\text{Ece\_2}}{\text{Path\_2}} + \gamma \cdot \frac{\text{Ece\_3}}{\text{Path\_3}},$$

where $\alpha$, $\beta$, $\gamma$ represents an anomaly factor corresponding to each detection method.

With the above method, the user is directly advised to re-construct the to-be-applied policy when the abnormality is relatively serious, which avoids an increase in a time cost caused by modifying a large quantity of abnormalities, improving an efficiency of writing and applying the quantitative trading policy.

Figure 4:
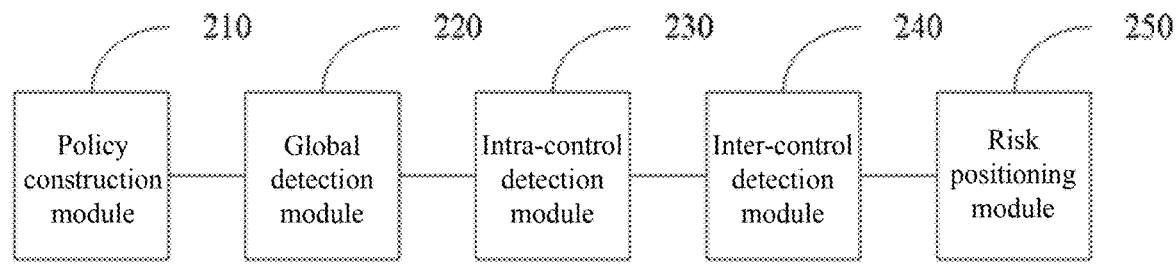
FIG. 4 illustrates a block diagram of a policy risk positioning apparatus according to an embodiment of the present disclosure.

FIG. 4 illustrates a policy risk positioning apparatus according to an embodiment of the present disclosure. The apparatus includes a policy construction module 210, a global detection module 220, an intra-control detection module 230, an inter-control detection module 240, and a risk positioning module 250.

The policy construction module 210 is configured to construct a to-be-applied policy in response to a drag-and-drop operation on a control in a canvas region.

The global detection module 220 is configured to detect a global composition of all controls in the canvas region in response to meeting a first policy detection condition, to obtain a global detection result.

The intra-control detection module 230 is configured to detect an internal parameter of each control in the canvas region in response to meeting a second policy detection condition, to obtain an intra-control detection result.

The inter-control detection module 240 is configured to detect a connection relationship between adjacent controls in the canvas region in response to meeting a third policy detection condition, to obtain an inter-control detection result.

The risk positioning module 250 is configured to position a risk existing in the to-be-applied policy based on the global detection result, the intra-control detection result and the inter-control detection result.

In an exemplary embodiment of the present disclosure, the apparatus is configured to: traverse an internal function of each condition control in response to meeting the first policy detection condition; and obtain, based on a function name of the internal function and a parameter name of the internal function, a quantity of market underlying objects used by all condition controls in the canvas region, to obtain a global detection result indicating the quantity of the market underlying objects; and determine that the to-be-applied policy has a risk in terms of the quantity of the market underlying objects when the quantity of the market underlying objects indicated by the global detection result is greater than a predetermined underlying object quantity threshold.

In an exemplary embodiment of the present disclosure, the apparatus is configured to: detect, in response to meeting the first policy detection condition, an island control isolated from a start box of the to-be-applied policy, to obtain a global detection result indicating the island control; and position, based on the island control indicated by the global detection result, the island control, and determine that the to-be-applied policy has a risk in terms of the island control.

In an exemplary embodiment of the present disclosure, the apparatus is configured to: traverse controls downwards level by level along a path where the start box is located to obtain a set of traversed controls; and eliminate the set of traversed controls from all the controls in the canvas region, and determine each of the remaining controls of all the controls in the canvas region as the island control.

In an exemplary embodiment of the present disclosure, the apparatus is configured to: traverse controls upwards level by level along a path where a leaf node control is located, until a vertex node control located at a vertex of the path where the leaf node control is located is traversed; and determine, in response to determining that a node type of the vertex node control is not a start box, each control traversed along the path where the leaf node control is located as the island control.

In an exemplary embodiment of the present disclosure, the apparatus is configured to: detect, in response to meeting the first policy detection condition, a node type of each leaf node control, to obtain a global detection result indicating a leaf node control with a node type being a non-event box; and position, based on the leaf node control with the node type being the non-event box as indicated by the global detection result, the leaf node control with the node type being the non-event box, and determine that the to-be-applied policy has a risk in terms of the leaf node control with the node type being the non-event box.

In an exemplary embodiment of the present disclosure, the apparatus is configured to: traverse the internal parameter of each control in response to meeting the second policy detection condition; and determine, based on a global variable used by the internal parameter, a global variable missed by the control, to obtain an intra-control detection result indicating the global variable missed by the control; and determine, based on the global variable missed by the control as indicated by the intra-control detection result, that the to-be-applied policy has a risk in terms of the global variable missed by the control.

In an exemplary embodiment of the present disclosure, the apparatus is configured to: determine, in response to meeting the second policy detection condition, logical legitimacy of a combinatorial condition in the to-be-applied policy based on the detected internal parameter of each control, to obtain an intra-control detection result indicating the logical legitimacy of the combinatorial condition; and position a logically illegal combinatorial condition in the to-be-applied policy based on the logical legitimacy of the combinatorial condition, and determine that the to-be-applied policy has a risk in terms of the logically illegal combinatorial condition.

In an exemplary embodiment of the present disclosure, the apparatus is configured to: detect, in response to meeting the third policy detection condition, a control with a node type being a condition box, and determining a definition of an exit connection line of the condition box, to obtain an inter-control detection result indicating the definition of the exit connection line; and position an incorrect connection line of the condition box based on the definition of the exit connection line indicated by the inter-control detection result, and determine that the to-be-applied policy has a risk in terms of the incorrect connection line.

An electronic device 30 according to an embodiment of the present disclosure is described below with reference to FIG. 5. The electronic device 30 illustrated in FIG. 5 is merely an example and should not impose any limitation on the functions and scope of use of the embodiments of the present disclosure.

Figure 5:
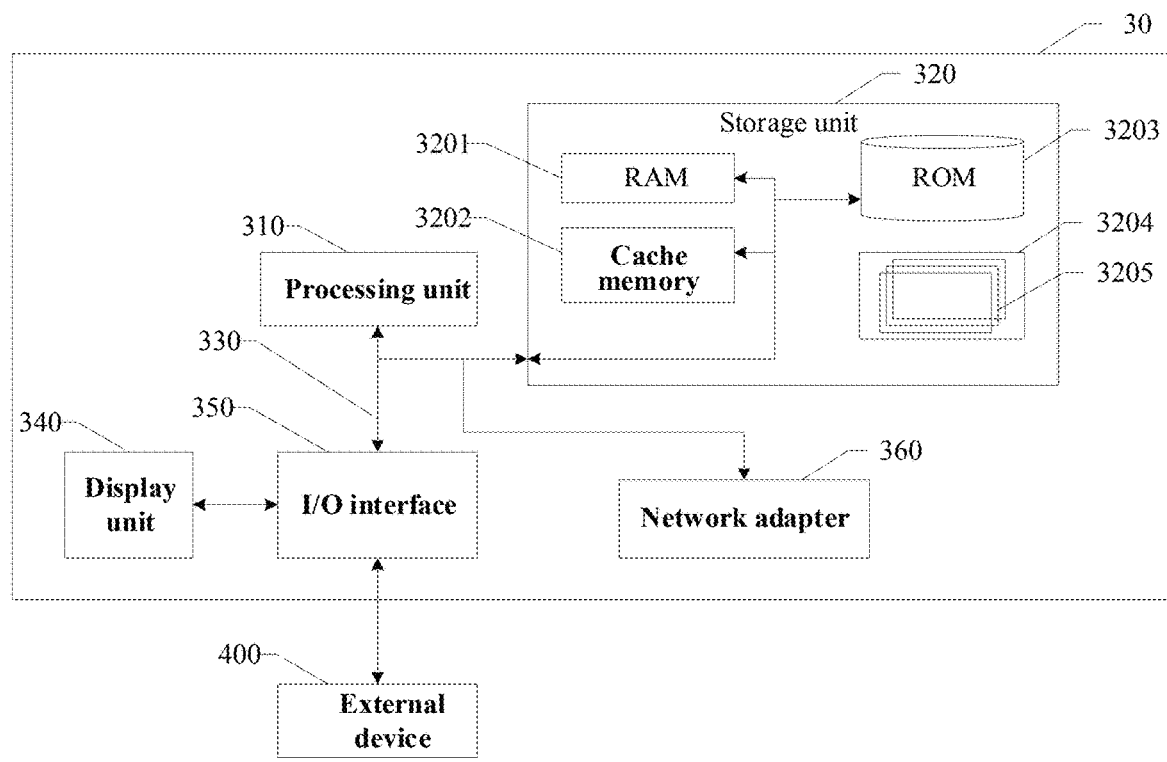
FIG. 5 illustrates a hardware diagram of an electronic device according to an embodiment of the present disclosure.

As illustrated in FIG. 5, the electronic device 30 is in a form of a general-purpose computing device. Components of the electronic device 30 may include, but are not limited to, at least one processing unit 310 described above, at least one storage unit 320 described above, and a bus 330 connecting different system components (including the storage unit 320 and the processing unit 310).

The storage unit has program codes stored thereon. The program codes are executable by the processing unit 310 such that the processing unit 310 performs operations at blocks according to various exemplary implementations of the present disclosure as described in part for describing the method. For example, the processing unit 310 may perform various operations at blocks as illustrated in FIG. 1.

The storage unit 320 may include a readable medium in a form of a volatile storage unit, such as a Random Access Memory (RAM) Unit 3201 and/or a cache memory unit 3202, and may further include a Read-Only Memory (ROM) unit 3203.

The storage unit 320 may further include a program/utility 3204 with a set of program modules 3205 (at least one program module 3205). Such program modules 3205 may include, but are not limited to, an operating system, one or more applications, other program modules, and program data. Any one or a combination of these examples may include an implementation of a network environment.

The bus 330 may represent one or more of several types of bus architectures, including a storage unit bus or a storage unit control bus, a peripheral bus, a graphic acceleration port bus, a processor bus, or a local bus using any bus architecture in a variety of bus architectures.

The electronic device 30 may also communicate with one or more external devices 400 (e.g., a keyboard, a pointing device, a Bluetooth device, etc.), one or more devices that enable a user to interact with the electronic device 30, and/or any device (e.g., a router, a modem, etc.,) that enables the electronic device 30 to communicate with one or more other computing devices. This kind of communication can be performed via an Input/Output (I/O) interface 350. The Input/Output (I/O) interface 350 is connected to a display unit 340. In addition, the electronic device 30 may also communicate with one or more networks (such as a Local Area Network (LAN), a Wide Area Network (WAN) and/or a public network such as the Internet) through a network adapter 360. As illustrated in the figure, the network adapter 360 communicates with other modules of the electronic device 30 over the bus 330. It should be understood that although not illustrated in FIG. 5, other hardware and/or software modules may be used in combination with the electronic device 30, which include, but not limited to, microcodes, device drivers, redundant processing units, external disk drive arrays, Redundant Arrays of Independent Disks (RAID) systems, tape drives, as well as data backup storage systems and the like.

From the above description of the embodiments, it is readily understood by those skilled in the art that the exemplary embodiments described herein may be implemented by means of software, or by means of software in combination with necessary hardware. Therefore, the technical solutions according to the embodiments of the present disclosure may be embodied in a form of a software product. The software product may be stored on a non-volatile storage medium (which may be a Compact Disc ROM (CD-ROM), a USB flash disk, a removable hard drive, etc.) or on a network, and include a number of instructions to cause a computing device (which may be a personal computer, a server, a terminal device, or a network device, etc.) to implement a method according to any of the embodiments of the present disclosure.

According to exemplary embodiments of the present disclosure, computer-readable storage medium is further provided. The computer-readable storage medium stores computer-readable instructions. The computer-readable instructions, when executed by a processor of a computer, cause the computer to perform the method according to any of the above method embodiments.

According to an embodiment of the present disclosure, a program product for implementing the method according to any of the above method embodiments is further provided. The program product may employ a portable CD-ROM, include program codes, and may run on a terminal device, such as a personal computer. However, the program product of the present disclosure is not limited in this regard. In the present disclosure, a readable storage medium may be any tangible medium that contains or stores a program. The program may be used by or in combination with an instruction execution system, an apparatus, or a device.

The program product may adopt any combination of one or more readable media. The readable medium may be a readable signal medium or a readable storage medium. For example, the readable storage medium may be, but is not limited to, an electrical, magnetic, optical, electromagnetic, infrared, or semiconductor system, apparatus, or device, or any combination thereof. Specific examples (a non-exhaustive list) of the readable storage medium include an electrical connection having one or more wires, a portable diskette, a hard disk, an RAM, a ROM, an Erasable Programmable ROM (EPROM) or a flash memory, an optical fiber, a CD-ROM, an optical storage device, a magnetic storage device, or any suitable combination thereof.

The computer-readable signal medium may include a data signal propagating in a baseband or as part of a carrier. The data signal carries readable program codes. The data signal propagating in such a manner may be in many forms, including but not limited to, an electromagnetic signal, an optical signal, or any suitable combination thereof. The readable signal medium may be any readable medium other than the readable storage medium, and may transmit, propagate, or transport programs used by or in combination with an instruction execution system, apparatus or device.

The program codes stored on the readable medium may be transmitted using any appropriate medium, including but not limited to a wireless medium, a wireline, an optical fiber cable, Radio Frequency (RF), or any suitable combination thereof.

Program codes for carrying out operations of the present disclosure may be written in one or more programming languages, including an object-oriented programming language, such as Java and C++, as well as conventional procedural programming language, such as "C" language or similar programming languages. The program codes may be executed entirely on a user's computing device, partly on a user device, as a separate software package, partly on the user's computing device and partly on a remote computing device, or entirely on a remote computing device or a remote server. In a case involving a remote computing device, the remote computing device may be connected to the user's computing device or an external computing device through any kind of network, including a Local Area Network (LAN) or a Wide Area Network (WAN) (e.g., over the Internet by using an Internet service provider).

It should be noted that although several modules or units of a device for action execution are mentioned in the detailed description above, such a division is not mandatory. In fact, according to the embodiments of the present disclosure, features and functions of two or more modules or units described above may be specified in one module or unit. Conversely, features and functions of the one module or unit described above may be further divided to be specified by multiple modules or units.

In addition, although operations at blocks of the method in the present disclosure are described in the accompanying drawings in a particular order, it does not necessarily require or imply that the operations at blocks must be performed in that particular order or that all of the operations at blocks illustrated must be performed to achieve a desired result. In addition or alternatively, certain operations at blocks may be omitted, multiple operations at blocks may be combined into an operation at one block for execution, and/or an operation at one block may be split into multiple operations at blocks for execution, etc.

From the above description of the embodiments, it is readily understood by those skilled in the art that the exemplary embodiments described herein may be implemented by means of software, or by means of software in combination with necessary hardware. Therefore, the technical solutions according to the embodiments of the present disclosure may be embodied in a form of a software product. The software product may be stored on a non-volatile storage medium (which may be a Compact Disc ROM (CD-ROM), a USB flash disk, a removable hard drive, etc.) or on a network, and include a number of instructions to cause a computing device (which may be a personal computer, a server, a mobile terminal, or a network device, etc.) to implement a method according to any of the embodiments of the present disclosure.

Other embodiments of the present disclosure are apparent to those skilled in the art upon consideration of the specification and from practicing of the disclosure disclosed here. The present disclosure is intended to encompass any variations, uses, or adaptations of the present disclosure, which follow the general principles of the present disclosure and include common knowledge or conventional technical means in the art that are not disclosed here. The description and embodiments are to be considered exemplary only. The real scope and the essence of the present disclosure are defined by the claims as appended.

What is claimed is:

1. A policy risk positioning method, performed by a processor of an electronic device in a financial field, the method comprising:
   constructing a to-be-applied policy in response to a drag-and-drop operation, performed by a user, on a control in a canvas region displayed on a display of the electronic device, the to-be-applied policy being used for automatically trading an underlying object;
   detecting a global composition of all controls in the canvas region in response to the user triggering a first policy detection condition, to obtain a global detection result, wherein the global detection result is used to indicate at least one of a quantity of all the controls, a quantity of market underlying objects, and existence of a control with a predetermined node type in the canvas region, wherein the control with the predetermined node type comprises an island control and/or a leaf node control with a node type being a non-event box;
   detecting an internal parameter of each control in the canvas region in response to the user triggering a second policy detection condition, to obtain an intra-control detection result, wherein the intra-control detection result is used to indicate at least one of legitimacy of the internal parameter of each control and a logical legitimacy of a condition extracted based on the internal parameter, wherein the legitimacy of the internal parameter is detected based on whether a global variable is used and/or whether a required parameter is omitted;
   detecting a connection relationship between adjacent controls in the canvas region in response to the user triggering a third policy detection condition, to obtain an inter-control detection result, wherein the inter-control detection result is used to indicate a definition of an exit connection line of a control with a node type being a condition box, wherein the definition of the exit connection line comprises Yes or No; and
   positioning a risk existing in the to-be-applied policy based on the global detection result, the intra-control detection result and the inter-control detection result, displaying risk reminding information, related to the risk existing in the to-be-applied policy, on the display for view by the user, and receiving operations performed by the user, on the control in the canvas region of the display, based on the risk reminding information,
   wherein:
   said detecting the global composition of all the controls in the canvas region in response to the user triggering the first policy detection condition to obtain the global detection result comprises: detecting, in response to the user triggering the first policy detection condition, a node type of each leaf node control, to obtain a global detection result indicating the leaf node control with the node type being the non-event box; and
   said positioning the risk existing in the to-be-applied policy based on the global detection result, the intra-control detection result and the inter-control detection result comprises: positioning, based on the leaf node control with the node type being the non-event box as indicated by the global detection result, the leaf node control with the node type being the non-event box; and determining that the to-be-applied policy has a risk in terms of the leaf node control with the node type being the non-event box.

2. The method according to claim 1, wherein:
said detecting the global composition of all the controls in the canvas region in response to the user triggering the first policy detection condition to obtain the global detection result further comprises: traversing an internal function of each condition control in response to the user triggering the first policy detection condition; and obtaining, based on a function name of the internal function and a parameter name of the internal function, the quantity of the market underlying objects used by all condition controls in the canvas region, to obtain a global detection result indicating the quantity of the market underlying objects; and
said positioning the risk existing in the to-be-applied policy based on the global detection result, the intra-control detection result and the inter-control detection result further comprises: determining, when the quantity of the market underlying objects indicated by the global detection result is greater than a predetermined underlying object quantity threshold, that the to-be-applied policy has a risk in terms of the quantity of the market underlying objects.

3. The method according to claim 1, wherein:
said detecting the global composition of all the controls in the canvas region in response to the user triggering the first policy detection condition to obtain the global detection result further comprises: detecting, in response to the user triggering the first policy detection condition, the island control isolated from a start box of the to-be-applied policy, to obtain a global detection result indicating the island control; and
said positioning the risk existing in the to-be-applied policy based on the global detection result, the intra-control detection result and the inter-control detection result further comprises: positioning, based on the island control indicated by the global detection result, the island control; and determining that the to-be-applied policy has a risk in terms of the island control.

4. The method according to claim 3, wherein said detecting the island control isolated from the start box of the to-be-applied policy comprises:
traversing controls downwards level by level along a path where the start box is located to obtain a set of traversed controls; and
eliminating the set of the traversed controls from all the controls in the canvas region, and determining each of the remaining controls of all the controls in the canvas region as the island control.

5. The method according to claim 3, wherein said detecting the island control isolated from the start box of the to-be-applied policy comprises:
traversing controls upwards level by level along a path where a leaf node control is located, until a vertex node control located at a vertex of the path where the leaf node control is located is traversed; and
determining, in response to determining that a node type of the vertex node control is not a start box, each of the control traversed along the path where the leaf node control is located as the island control.

6. The method according to claim 1, wherein the first policy detection condition comprises a detection of a backtest operation performed on the to-be-applied policy, a detection of a live trading operation performed on the to-be-applied policy, and a detection of a logic verification operation performed on the to-be-applied policy.

7. The method according to claim 1, wherein:
said detecting the internal parameter of each control in the canvas region in response to the user triggering the second policy detection condition to obtain the intra-control detection result comprises: traversing the internal parameter of each control in response to the user triggering the second policy detection condition; and determining, based on a global variable used by the internal parameter, a global variable missed by the control, to obtain an intra-control detection result indicating the global variable missed by the control; and
said positioning the risk existing in the to-be-applied policy based on the global detection result, the intra-control detection result and the inter-control detection result further comprises: determining, based on the global variable missed by the control as indicated by the intra-control detection result, that the to-be-applied policy has a risk in terms of the global variable missed by the control.

8. The method according to claim 1, wherein:
said detecting the internal parameter of each control in the canvas region in response to the user triggering the second policy detection condition to obtain the intra-control detection result comprises: determining, in response to the user triggering the second policy detection condition, logical legitimacy of a combinatorial condition in the to-be-applied policy based on the detected internal parameter of each control, to obtain an intra-control detection result indicating the logical legitimacy of the combinatorial condition; and
said positioning the risk existing in the to-be-applied policy based on the global detection result, the intra-control detection result and the inter-control detection result further comprises: positioning a logically illegal combinatorial condition in the to-be-applied policy based on the logical legitimacy of the combinatorial condition, and determining that the to-be-applied policy has a risk in terms of the logically illegal combinatorial condition.

9. The method according to claim 1, wherein the second policy detection condition comprises a detection of an edit operation performed on the control.

10. The method according to claim 1, wherein:
said detecting the connection relationship between the adjacent controls in the canvas region in response to the user triggering the third policy detection condition to obtain the inter-control detection result comprises: detecting, in response to the user triggering the third policy detection condition, a control with a node type being the condition box; and determining the definition of the exit connection line of the condition box, to obtain an inter-control detection result indicating the definition of the exit connection line; and
said positioning the risk existing in the to-be-applied policy based on the global detection result, the intra-control detection result and the inter-control detection result further comprises: positioning an incorrect connection line of the condition box based on the definition of the exit connection line indicated by the inter-control detection result; and determining that the to-be-applied policy has a risk in terms of the incorrect connection line.

11. The method according to claim 1, wherein the third policy detection condition comprises a detection of a remove operation performed on the control and a detection of a line connection operation performed on the control.

12. An electronic device in a financial field, comprising:
one or more processors; and
a storage device having one or more programs stored thereon, wherein the one or more programs, when executed by the one or more processors, cause the electronic device to:
construct a to-be-applied policy in response to a drag-and-drop operation, performed by a user, on a control in a canvas region displayed on a display of the electronic device, the to-be-applied policy being used for automatically trading an underlying object;
detect a global composition of all controls in the canvas region in response to the user triggering a first policy detection condition, to obtain a global detection result, wherein the global detection result is used to indicate at least one of a quantity of all the controls, a quantity of market underlying objects, and existence of a control with a predetermined node type in the canvas region, wherein the control with the predetermined node type comprises an island control and/or a leaf node control with a node type being a non-event box;
detect an internal parameter of each control in the canvas region in response to the user triggering a second policy detection condition, to obtain an intra-control detection result, wherein the intra-control detection result is used to indicate at least one of legitimacy of the internal parameter of each control and a logical legitimacy of a condition extracted based on the internal parameter, wherein the legitimacy of the internal parameter is detected based on whether a global variable is used and/or whether a required parameter is omitted;
detect a connection relationship between adjacent controls in the canvas region in response to the user triggering a third policy detection condition, to obtain an inter-control detection result, wherein the inter-control detection result is used to indicate a definition of an exit connection line of a control with a node type being a condition box, wherein the definition of the exit connection line comprises Yes or No; and
position a risk existing in the to-be-applied policy based on the global detection result, the intra-control detection result and the inter-control detection result, display risk reminding information, related to the risk existing in the to-be-applied policy, on the display for view by the user, and receive operations performed by the user, on the control in the canvas region of the display, based on the risk reminding information,
wherein:
detecting the global composition of all the controls in the canvas region in response to the user triggering the first policy detection condition to obtain the global detection result comprises: detecting, in response to the user triggering the first policy detection condition, a node type of each leaf node control, to obtain a global detection result indicating the leaf node control with the node type being the non-event box; and
positioning the risk existing in the to-be-applied policy based on the global detection result, the intra-control detection result and the inter-control detection result comprises: positioning, based on the leaf node control with the node type being the non-event box as indicated by the global detection result, the leaf node control with the node type being the non-event box; and determining that the to-be-applied policy has a risk in terms of the leaf node control with the node type being the non-event box.

13. A non-transitory computer-readable storage medium, having computer-readable instructions stored thereon, wherein the computer-readable instructions, when executed by a processor of a computer, cause the computer to perform the method according to claim 1.

* * * * *